US011817736B2

(12) United States Patent
Vasylenko

(10) Patent No.: US 11,817,736 B2
(45) Date of Patent: Nov. 14, 2023

(54) ANTICIPATORY EVENT BASED BATTERY CHARGING

(71) Applicant: DISH Network L.L.C., Englewood, CO (US)

(72) Inventor: Yevhen Vasylenko, Kharkov (UA)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/168,506

(22) Filed: Feb. 13, 2023

(65) Prior Publication Data

US 2023/0198281 A1 Jun. 22, 2023

Related U.S. Application Data

(63) Continuation of application No. 17/110,050, filed on Dec. 2, 2020, now Pat. No. 11,605,966.

(51) Int. Cl.
*H01M 10/44* (2006.01)
*H01M 10/46* (2006.01)
*H02J 7/00* (2006.01)

(52) U.S. Cl.
CPC .... *H02J 7/007188* (2020.01); *H02J 7/00032* (2020.01); *H02J 7/0042* (2013.01)

(58) Field of Classification Search
CPC ............... H02J 7/0042; H02J 7/00032; H02J 7/007188; H02J 7/0071; H02J 2310/22; H01M 10/4257

USPC ....... 320/107, 114, 115, 128, 137, 152, 162, 320/106; 713/300

See application file for complete search history.

(56) References Cited

U.S. PATENT DOCUMENTS

| | | | |
|---|---|---|---|
| 10,769,555 B2 * | 9/2020 | Wild | B60L 53/67 |
| 10,840,723 B1 | 11/2020 | Rafferty et al. | |
| 11,605,966 B2 * | 3/2023 | Vasylenko | H02J 7/0042 |
| 2010/0082570 A1 * | 4/2010 | Altaf | G06F 16/332 |
| | | | 707/706 |
| 2013/0346762 A1 * | 12/2013 | Hodges | G06F 1/263 |
| | | | 713/300 |
| 2015/0123595 A1 * | 5/2015 | Hussain | H02J 7/00712 |
| | | | 320/107 |
| 2016/0261131 A1 | 9/2016 | Childress et al. | |
| 2021/0288509 A1 * | 9/2021 | Werner | H02J 7/00041 |

FOREIGN PATENT DOCUMENTS

EP 3832583 A1 * 6/2021 ............ H02J 7/0048

* cited by examiner

*Primary Examiner* — Edward Tso
(74) *Attorney, Agent, or Firm* — Seed IP Law Group LLP

(57) ABSTRACT

A smart charger and associated methods and systems are disclosed. The smart charger identifies an anticipatory event that triggers battery charging, selects a battery charging profile that matches the anticipatory event, charges the battery of a mobile device based on the battery charging profile, and updates criteria for identifying anticipatory events and/or the battery charging profile that matches the anticipatory event.

20 Claims, 4 Drawing Sheets

ANTICIPATORY EVENT BASED BATTERY CHARGING

BACKGROUND

Technical Field

The present disclosure relates generally to battery charging management, and more specifically to predicative and dynamic battery charging control by a smart charger.

Description of the Related Art

A battery charger is a device used to put energy into a secondary cell or rechargeable battery by forcing an electric current through it. The charging protocol (how much voltage or current for how long, and what to do when charging is complete, for instance) depends on the size and type of the battery being charged. The charger may have temperature or voltage sensing circuits and a microprocessor controller to adjust the charging current and voltage, and start or end charging. Slow battery chargers may take several hours to complete a charge. High-rate chargers may restore most capacity much faster, but high rate chargers can be more than some battery types can tolerate.

Universal Serial Bus (USB) based chargers can use a USB cable to connect to a device for charging its battery. USB chargers can typically be used for cellular phones, portable digital audio players, and tablet computers. They may be fully compliant USB peripheral devices adhering to USB power discipline, or uncontrolled in some manners.

BRIEF DESCRIPTION OF THE SEVERAL VIEWS OF THE DRAWINGS

The present disclosure will be more fully understood by reference to the following figures, which are for illustrative purposes only. The figures are not necessarily drawn to scale, and elements of similar structures or functions are generally represented by like reference numerals for illustrative purposes throughout the figures. The figures do not describe every aspect of the teachings disclosed herein, and do not limit the scope of the claims.

DETAILED DESCRIPTION

Figure 1:
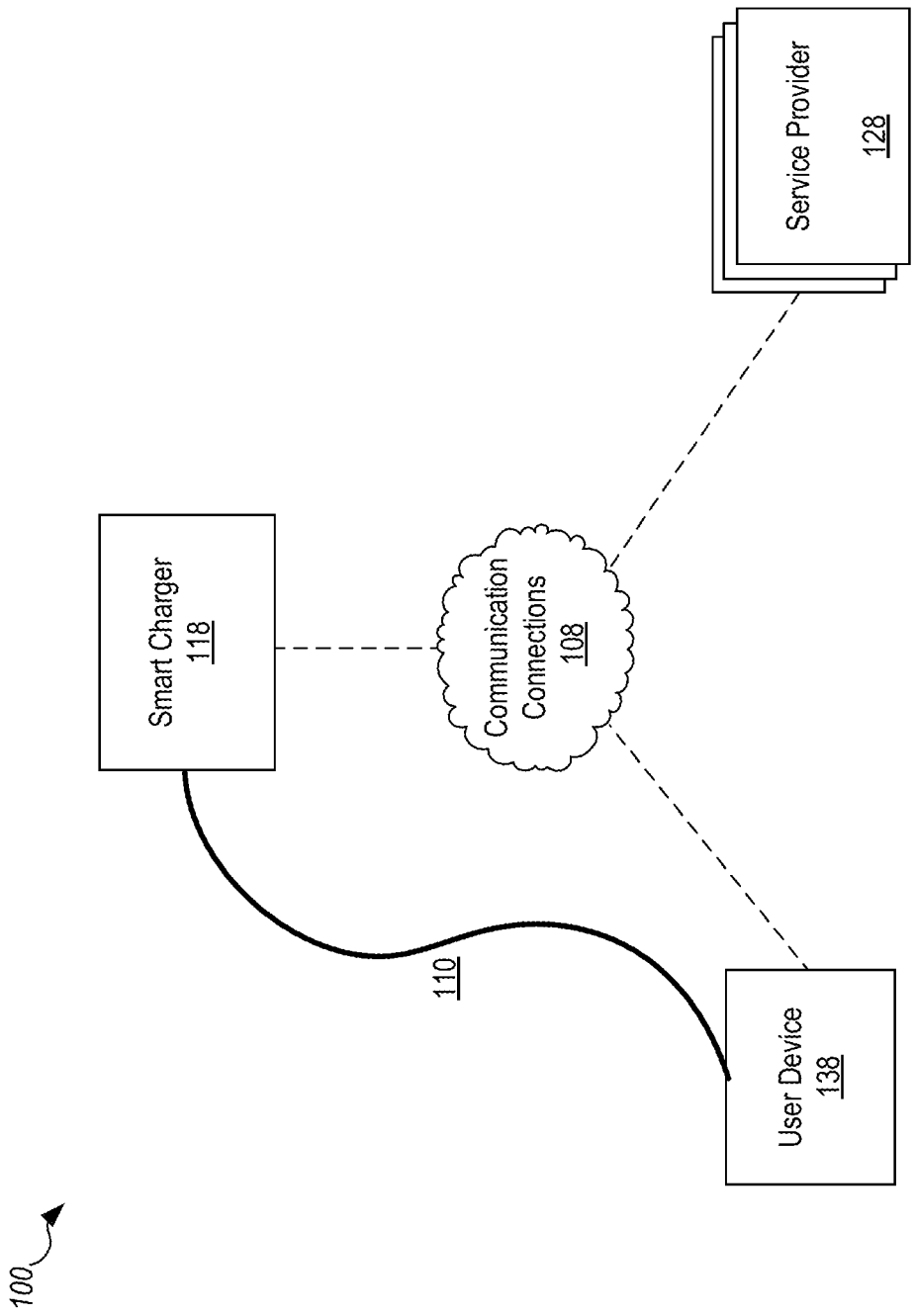
FIG. 1 is a block diagram illustrating an example networked environment for smart charging in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Each of the features and teachings disclosed herein may be utilized separately or in conjunction with other features and disclosure to provide a system and method for achieving predicative and dynamic battery charging control. Representative examples utilizing many of these additional features and teachings, both separately and in combination, are described in further detail with reference to the attached FIGS. 1-4. This detailed description is intended to teach a person of skill in the art further details for practicing aspects of the present disclosure, and is not intended to limit the scope of the claims. Therefore, combinations of features disclosed above in the detailed description may not be necessary to practice the teachings in the broadest sense, and are instead disclosed merely to describe particularly representative examples of the present disclosure.

In the description below, for purposes of explanation only, specific nomenclature is set forth to provide a thorough understanding of the system and method for achieving context awareness by the smart device or smart system. However, it will be apparent to one skilled in the art that these specific details are not required to practice the teachings of the current disclosure. Also, other methods and systems may also be used.

Smartphones and many other mobile devices are integral to our daily life, and their batteries sometimes cannot keep up with our daytime needs. Many choose to charge mobile devices overnight. During overnight charging, the mobile device constantly uses battery to stay functional; and when consumption happens, recharging happens, causing premature degradation of battery quality and battery life. For example, most smartphones nowadays use Lithium-ion batteries (LiB). Full charge of LiB can be completed in a few hours for a typical mobile device, and then LiB suffers from stress when dwelling at full state-of-charge (100%). When such charging pattern occurs consistently, the battery's recoverable capacity will drop. Further, it's not advisable to fully charge a LiB: the closer it gets to 100%, the more degradation it incurs. Generally, battery level outside the 20%-80% range will degrade the battery more.

The present disclosure relates generally to battery charging management, and more specifically to predicative and dynamic battery charging control. In various embodiments, a smart charger can be physically connectable to a mobile device via a charging interface (e.g., a USB cable) to charge its battery. The smart charger and the mobile device can independently communicate with third party services. The smart charger identifies an anticipatory event that triggers battery charging, using one or more criteria. Such criteria can be determined based one or more machine learning models including artificial neural networks, support vector machines, and/or decision trees. To identify the anticipatory event, the smart charger communicates with third party service(s) (e.g., a calendar service) associated with a user of the mobile device. In some embodiments, this communication is performed independently from the mobile device.

The smart charger then selects a battery charging profile that matches the anticipatory event, and charges the battery of the mobile device based thereon. The battery charging profile indicates at least one of charging duration, charging start time, charging end time, or charging mode. The battery charging profile can be selected from existing profiles, which are determined based on one or more attributes of the mobile device, one or more attributes of the battery of the mobile device, type of anticipatory events, or one or more user inputs. In some embodiments, based on the data and information collected during the current charging process, the smart charger updates one or more criteria for identifying anticipatory events that trigger battery charging and/or the battery charging profiles.

FIG. 1 is a block diagram illustrating an example networked environment 100 for smart charging in accordance with some embodiments of the techniques described herein. The networked environment 100 includes a smart charger 118, one or more service providers 128, and a user device 138, which are interconnected with one another via at least some part of communication connections 108. Additionally, the smart charger 118 and the user device 138 can be connected via a battery charging connection 110.

In the depicted networked environment 100, the communication connections 108 may comprise one or more computer networks, one or more wired or wireless networks, satellite transmission media, one or more cellular networks, or some combination thereof. The communication connections 108 may include a publicly accessible network of linked networks, possibly operated by various distinct parties, such as the Internet. The communication connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the communication connections 108 may include various types of wired and/or wireless networks in various situations, including satellite transmission. In addition, the communication connections 108 may include one or more communication interfaces to individual entities in the networked environment 100, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like. The battery charging connection 110 may include wired and/or wireless charging interfaces, for example, based on Programmable Power Supply, USB, and/or Qi technologies. In some embodiments, the battery charging connection 110 is part of the communication connections 108.

In various embodiments, examples of a user device 138 include, but are not limited to, one or a combination of the following: a "computer," "mobile device," "tablet computer," "smart phone," "handheld computer," and/or "workstation," etc. The user device(s) 138 may be any suitable computing device or electronic equipment that, e.g., operates on battery and is able to communicate with at least the service provider(s) 128.

In various embodiments, the smart charger 118 can include a power source and one or more computing devices for facilitating and performing smart charging functions described herein. The smart charger 118 can include functional units for detecting battery charge condition of the user device 138 (e.g., percentage of charge), charging related battery attribute (e.g., whether the battery of the user device 138 is in a suitable condition to sustain high current fast charging). In various embodiments, individual service providers 128 can be implemented in software and/or hardware form on one or more computing devices including a "computer," "mobile device," "tablet computer," "smart phone," "handheld computer," and/or "workstation," etc. The service provider(s) 128 can provide content, service, forum, or other Internet utilities.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Figure 2:
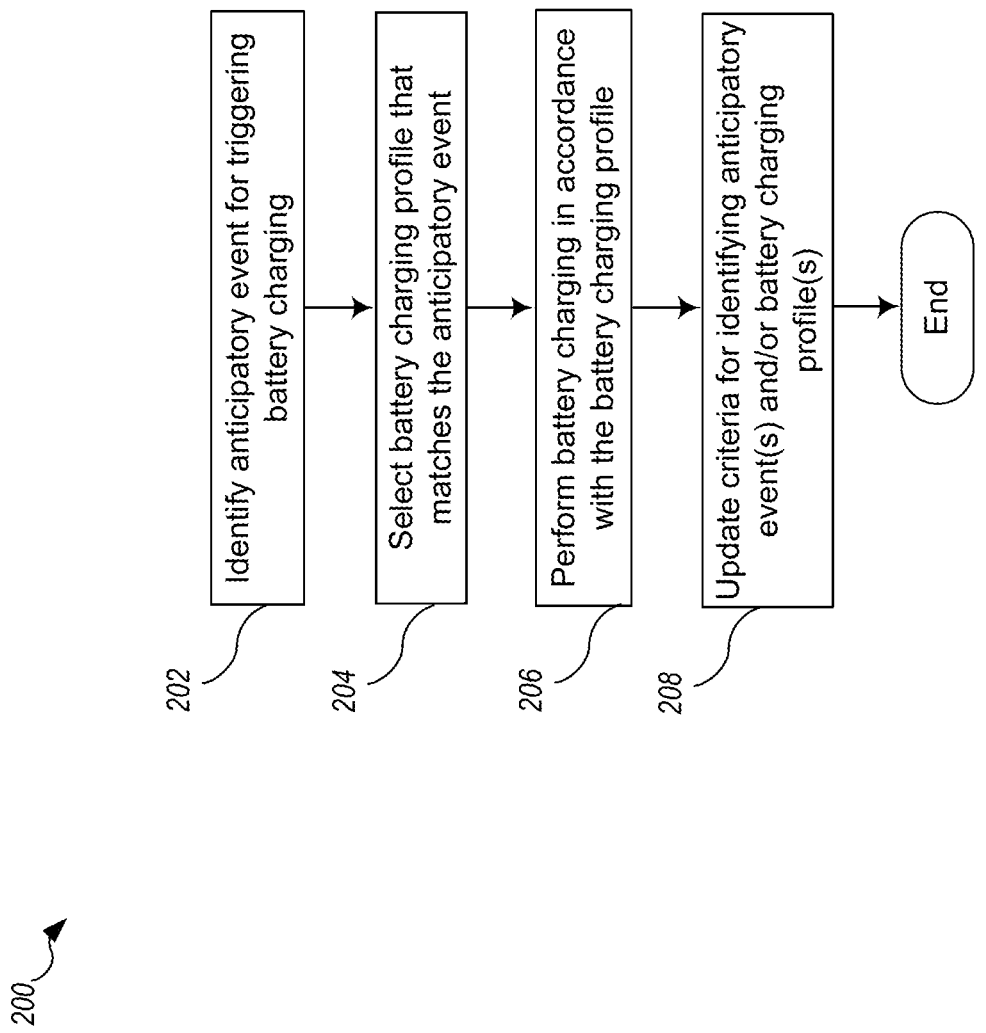
FIG. 2 is a flow diagram depicting an example process for performing smart charging in accordance with some embodiments of the techniques described herein.

FIG. 2 is a flow diagram depicting an example process 200 for performing smart charging in accordance with some embodiments of the techniques described herein. Illustratively, at least some part of the process 200 can be implemented by the smart charger 118 of FIG. 1.

The process 200 starts at block 202, which includes identifying anticipatory event(s) for triggering charging of the battery of a user device 138. The identification can be based on one or more criteria that are predefined or dynamically generated. In some embodiments, the criteria for identifying the anticipatory event(s) are obtained based on one or more machine learning models.

Illustratively, the smart charger 118 communicates with one or more service providers 128 to retrieve data regarding current and/or future activity of the user device 138 or its user. For example, the smart charger 118 can access the user's calendar or scheduling service and retrieve scheduling information for a threshold period of time (e.g., the next 24 or 48 hours). In some embodiments, the communication between the smart charger 118 and the service provider(s) 128 is independent from the user device 138 (e.g., without accessing content stored on the user device 138 or relying on communication between the user device 138 and the service provider(s) 128). The smart charger 118 can identify anticipatory event(s) from the retrieved information using one or more machine learning models (e.g., an artificial neural network, support vector machine, and/or decision tree) that has been trained to perform such identification. Illustratively, the anticipatory events can include a conference call, an extended commute, an airline flight, or the like.

In some embodiments, the smart charger 118 identifies anticipatory event(s) (e.g., user getting up in the morning) based on historical data collected by the smart charger itself. For example, the smart charger 118 can analyze historical data it collected over a most recent period of time (e.g., to determine the temporal pattern with which the user device is connected to and/or disconnected from the smart charger) and predict anticipatory event(s) using a trained machine learning model.

At block 204, the process 200 includes selecting a battery charging profile from multiple established charging profiles that matches the identified anticipatory event. In some embodiments, the selected battery charging profile indicates at least one of a charging duration, charging start time relative to the anticipatory event, charging end time relative to the anticipatory event, or charging mode (e.g., fast charging, trickle charging, charging to full capacity, charging to a certain percentage of capacity, or the like). At block 206, the process 200 includes performing battery charging in accordance with the selected battery charging profile. Illustratively, the smart charger 118 initiates and performs charging of the battery of the user device 138, if it is connected to the smart charger 118. In some embodiments where the user device 138 is not connected to the smart charger 118, it notifies the user of the user device (e.g., via a text message or any communication channel associated a service provider 128) of the need to charge battery. In some embodiments, the notification can be sent with a lead time (e.g., 10 minutes prior to anticipated charging start time), a characterization of the identified anticipatory event, and/or other contextual information.

At block 208, the process 200 includes updating the criteria for identifying anticipatory event(s) and/or battery charging profile(s). In some embodiments, the smart charger 118 collects data associated with the present charging process and uses them to update the training data (e.g., by replacing most dated training data with most recently collected data) for related machine learning models. As such, the related machine learning models are re-trained to generate updated criteria (e.g., with updated model parameters) for identifying anticipatory event(s). In some embodiments, the smart charger 118 senses or otherwise collects data on battery condition change, user device performance deviation, and/or other battery charging related changes during the present charging process. Such changes can trigger the smart charger to update relevant battery charging profile(s) including the currently selected profile. The updated criteria and/or battery charging profiles are used as a basis for the next round of smart charging.

Figure 3:
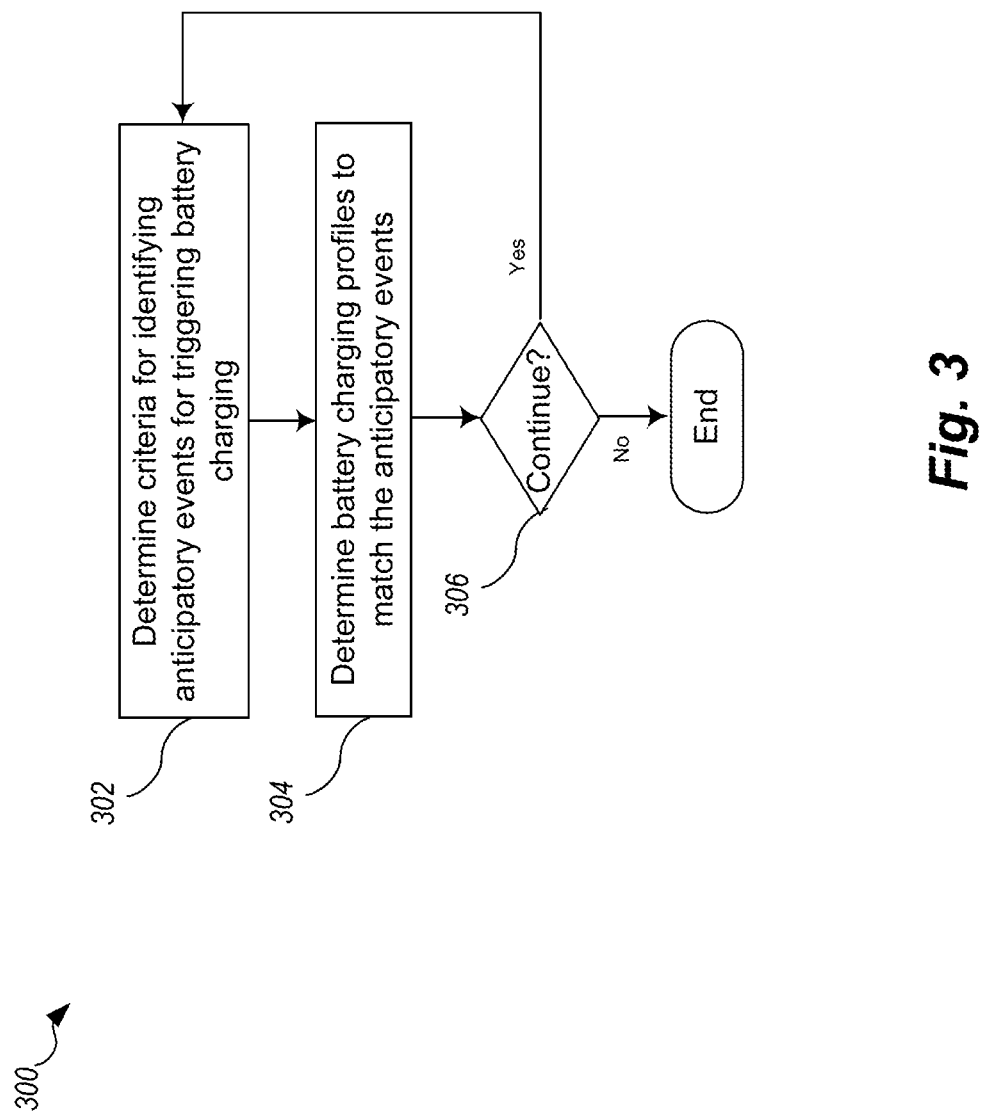
FIG. 3 is a flow diagram depicting an example process for facilitating smart charging in accordance with some embodiments of the techniques described herein.

FIG. 3 is a flow diagram depicting an example process 300 for facilitating smart charging in accordance with some embodiments of the techniques described herein. Illustratively, at least some part of the process 300 can be implemented by the smart charger 118 of FIG. 1.

The process 300 starts at block 302, which includes determining one or more criteria for identifying anticipatory events for triggering battery charging. As described previously, in some embodiments, the criteria for identifying the anticipatory event(s) are obtained based on one or more machine learning models. Historical data regarding activity of the user device or its user over a period of time can be retrieved from one or more service providers, the user device, and/or the smart charger itself. Additionally, battery charge and condition information for the same period of time associated with the historical activity data can be collected by the smart charger and/or from the user device. The data can be analyzed and labeled (e.g., battery is typically charged prior to some particular type of activity) to serve as training data, which the smart charger 118 or a remote service can use to train the one or more learning models so that they can be applied to new activity data.

At block 304, the process 300 includes determining battery charging profiles to match anticipatory events. The determination can be based on attribute(s) of the user device, attribute(s) of the battery of the mobile device, type of anticipatory events, and/or user inputs. Illustratively, historical data of user device performance and battery charging/depletion can be analyzed. For example, the background and active applications on the user device, the amount of time between each charge, the use of the user device during that time period, the rate at which the battery discharges, the charging and discharging sequences, and/or the like can be mapped to different types of anticipatory events in the same period of time associated with the historical data. With or without further user inputs, proper battery charging profiles including improvements and/or optimizations derived from the analysis can be generated to match the different type of anticipatory events. For example, a proper battery charging profile can require charging to start closer in time to an anticipatory event than reflected by historical data, to charge up to 80% capacity rather than full capacity as reflected by historical data, to avoid fast charging due to deteriorated battery condition as reflected by historical data, or the like. Accordingly, battery charging profiles can instruct the smart charger to delay, pause, stop, or otherwise manipulate charging of the battery of a user device, when it is connected to the charger. In some embodiments, the smart charger can receive user input to override applicable battery charging profiles and perform charging as a typical battery charger. At block 306, the process 300 includes determining whether to continue the process. If so, the process proceeds to block 302; otherwise, the process ends.

Those skilled in the art will appreciate that the various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
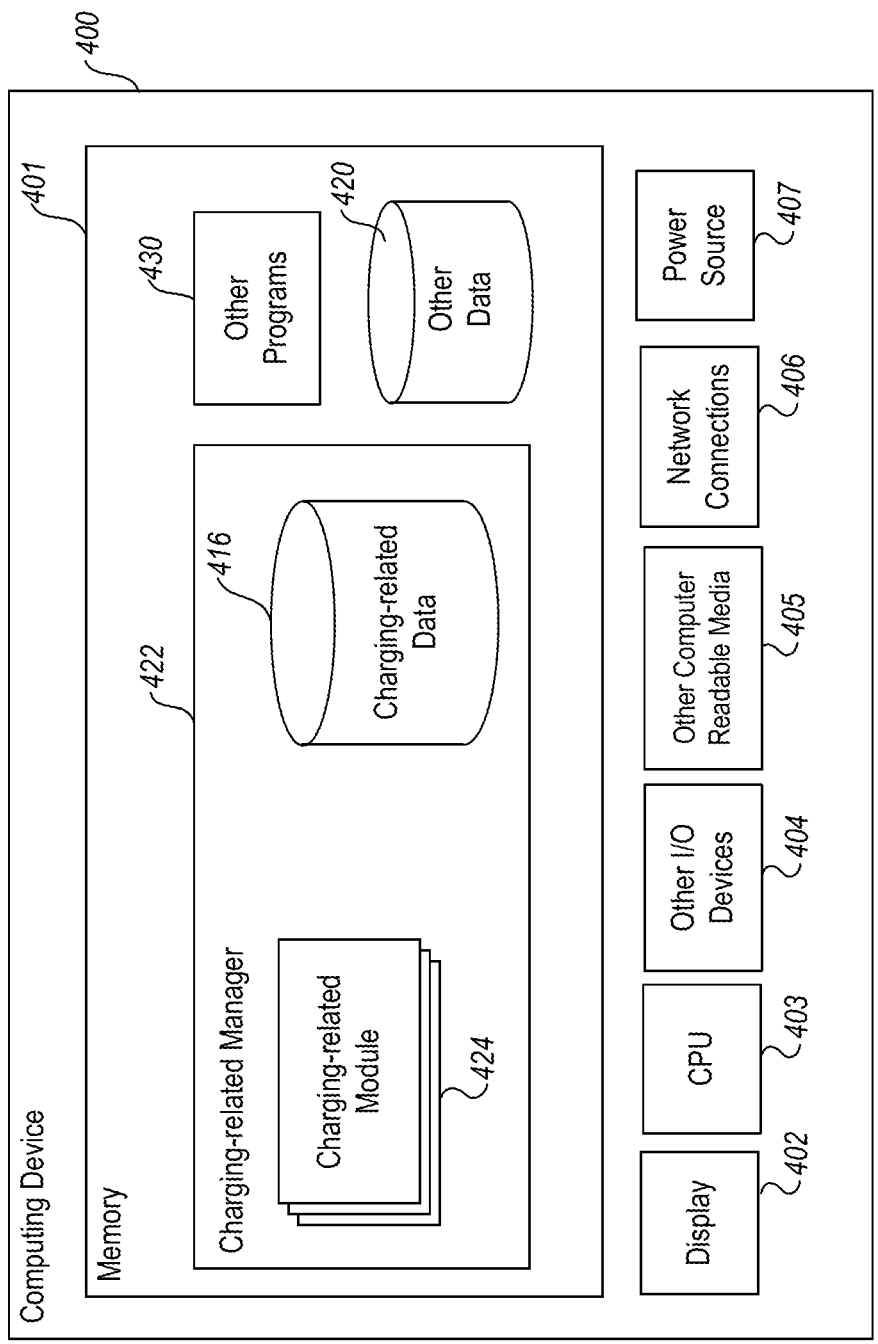
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a smart charger 118, user device 138, service provider 128, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the charging-related manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units ("CPU") 403, Input/Output ("I/O") devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The charging-related manager 422 is shown residing in memory 401. In other embodiments, some portion of the contents and some, or all, of the components of the charging-related manager 422 may be stored on and/or transmitted over the other computer-readable media 405. The components of the computing device 400 and charging-related manager 422 can execute on one or more CPUs 403 and implement applicable functions described herein. In some embodiments, the charging-related manager 422 may operate as, be part of, or work in conjunction and/or cooperation with other software applications stored in memory 401 or on various other computing devices. In some embodiments, the charging-related manager 422 also facilitates communication with peripheral devices via the I/O devices 404, or with another device or system via the network connections 406.

The one or more charging-related modules 424 is configured to perform actions related, directly or indirectly, to smart charging as described herein. In some embodiments, the charging-related module(s) 424 stores, retrieves, or otherwise accesses at least some charging-related data on some portion of the charging-related data storage 416 or other data storage internal or external to the computing device 400. The charging-related modules 424 may control or comprise interfaces for controlling delivery of power from a power source, such as power source 407, to a user device, such as user device 138, via a downstream port of I/O devices 404 (e.g., via a USB connection) for smart charging as described herein. In various embodiments, at least some of the charging-related modules 424 may be implemented in software or hardware.

Other code or programs 430 (e.g., further data processing modules, a program guide manager module, a Web server, and the like), and potentially other data repositories, such as data repository 420 for storing other data, may also reside in the memory 401, and can execute on one or more CPUs 403. Of note, one or more of the components in FIG. 4 may or may not be present in any specific implementation. For example, some embodiments may not provide other computer readable media 405 or a display 402.

In some embodiments, the computing device 400 and charging-related manager 422 include API(s) that provides programmatic access to add, remove, or change one or more functions of the computing device 400. In some embodiments, components/modules of the computing device 400 and charging-related manager 422 are implemented using standard programming techniques. For example, the charging-related manager 222 may be implemented as an executable running on the CPU 403, along with one or more static or dynamic libraries. In other embodiments, the computing device 400 and charging-related manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the charging-related manager 422. In some embodiments, instructions cause the CPU 403 or some other processor, such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a charging-related manager 422 implementation. Also, other functions could be implemented and/or performed by each component/module, and in different orders, and by different components/modules, yet still achieve the functions of the computing device 400 and Rulebook-related manager 422.

In addition, programming interfaces to the data stored as part of the computing device 400 and Rulebook-related manager 422, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The charging-related data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the charging-related manager 422.

Furthermore, in some embodiments, some or all of the components of the computing device 400 and charging-related manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for charging a battery of a mobile device, comprising:
   selecting, by a battery charging device separate from the mobile device, a battery charging profile from a plurality of battery charging profiles each indicating at least one of a different charging duration or different charging mode, based, at least in part, on an anticipatory event;
   charging, by the battery charging device, the battery of the mobile device based, at least in part, on the selected battery charging profile; and
   updating, by the battery charging device, at least one of the plurality of battery charging profiles.

2. The method of claim 1, wherein the battery charging device is physically connectable to the mobile device via a charging interface.

3. The method of claim 2, wherein the charging interface implements Universal Serial Bus (USB) standard.

4. The method of claim 1, further comprising identifying, by the battery charging device, the anticipatory event based, at least in part, on one or more criteria.

5. The method of claim 4, further comprising determining the one or more criteria for identifying anticipatory events based, at least in part, on one or more machine learning models.

6. The method of claim 5, wherein the one or more machine learning models include at least one of an artificial neural network, support vector machine, or decision tree.

7. The method of claim 4, wherein identifying, by the battery charging device, the anticipatory event comprises communicating, by the battery charging device, with a third party service associated with a user of the mobile device.

8. The method of claim 7, wherein the third party service includes a calendar service.

9. The method of claim 7, wherein communicating, by the battery charging device, with the third party service associated with the user of the mobile device is performed independently from the mobile device.

10. The method of claim 1, further comprising obtaining data on at least one of battery condition change or mobile device performance deviation during the charging.

11. The method of claim 10, wherein updating, by the battery charging device, at least one of the plurality of battery charging profiles is based, at least in part, on the obtained data.

12. The method of claim 11, wherein selecting, by the battery charging device, the battery charging profile from the plurality of battery charging profiles is further based, at least in part, on one or more attributes of the mobile device, one or more attributes of the battery of the mobile device, type of anticipatory events, or one or more user inputs.

13. One or more non-transitory computer-readable media collectively storing contents that, when executed by one or more processors, cause the one or more processors to perform actions comprising:
   selecting, by a charging device separate from a mobile device, a battery charging profile from a plurality of battery charging profiles each indicating at least one of a different charging duration or different charging mode, based, at least in part, on an anticipatory event;
   charging, by the charging device, a battery of the mobile device based, at least in part, on the selected battery charging profile; and
   updating, by the charging device, at least one of the plurality of battery charging profiles.

14. The one or more non-transitory computer-readable media of claim 13, wherein the actions further comprise updating one or more criteria for identifying another anticipatory event.

15. The one or more non-transitory computer-readable media of claim 13, wherein the actions further comprise charging the battery of the mobile device based, at least in part, on the updated at least one of the battery charging profiles.

16. The one or more non-transitory computer-readable media of claim 13, wherein the actions further comprise obtaining data on at least one of battery condition change or mobile device performance deviation, during the charging.

17. The one or more non-transitory computer-readable media of claim 16, wherein updating the at least one of the plurality of battery charging profiles is based, at least in part, on the obtained data.

18. A battery charger comprising:
one or more processors; and
memory storing contents that, when executed by the one or more processors, cause the battery charger to:
select a battery charging profile from a plurality of battery charging profiles each indicating at least one of a different charging duration or different charging mode, based, at least in part, on an anticipatory event;
cause charging of a battery of a mobile device separate from the battery charger based, at least in part, on the selected battery charging profile; and
update at least one of the plurality of battery charging profiles.

19. The battery charger of claim 18, wherein the battery charger is communicatively connected to one or more third party services associated with a user of the mobile device, independent from communicative connections between the mobile device and the one or more third party services.

20. The battery charger of claim 18, wherein updating the at least one of the plurality of battery charging profiles is based, at least in part, on data obtained during the charging.

* * * * *